Patented July 6, 1948

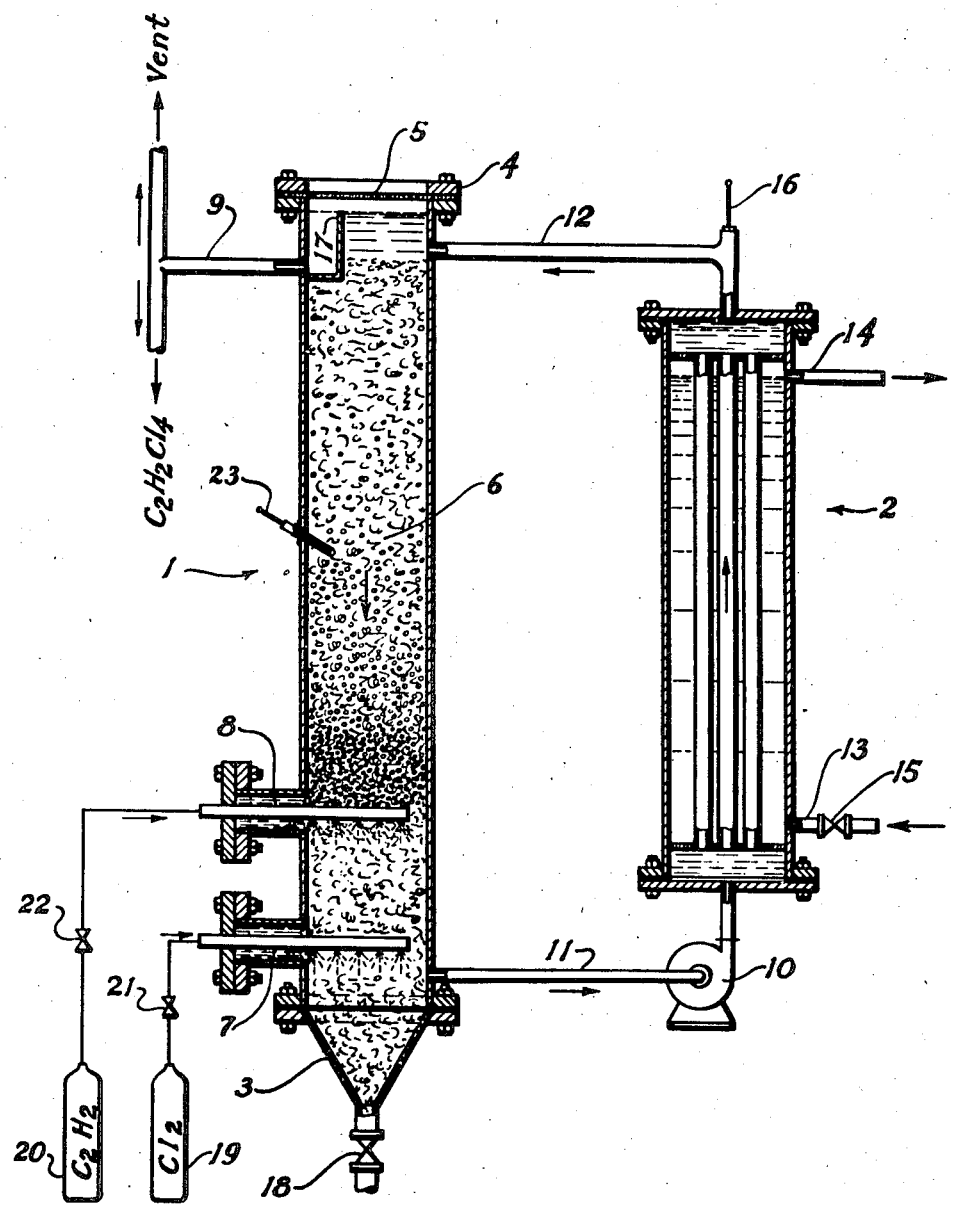

2,444,661

UNITED STATES PATENT OFFICE 2,444,661

PROCESSES FOR PRODUCTION OF ACETYLENE TETRACHLORIDE

Aylmer H. Maude, Niagara Falls, N. Y., assignor to Hooker Electrochemical Company, Niagara Falls, N. Y., a corporation of New York Application February 9, 1946, Serial No. 646,553

6 Claims. (Cl. 260—660)

My process relates more particularly to production of acetylene tetrachloride by reaction of acetylene with elemental chlorine in presence of anhydrous ferric chloride. Gaseous chlorine reacts with gaseous acetylene with explosive violence, producing nothing but HCl, and liberating the carbon. It is known, however, that if these reagents are brought together in a medium of acetylene tetrachloride, and in presence of anhydrous ferric chloride, they may be made to react without violence, to produce more acetylene tetrachloride in accordance with the following reaction:

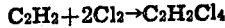

$$C_2H_2 + 2Cl_2 \rightarrow C_2H_2Cl_4$$

Ferric chloride is difficult to make and maintain in anhydrous form, being exceedingly hygroscopic. For the purpose of this reaction, it is preferably formed in situ, by carrying out the reaction in a vessel packed with coarsely comminuted iron. Heretofore, it has been thought that the acetylene should be introduced into the reactor below the chlorine. I have found, however, that when this is done, a certain proportion of the two reagents are liable to come together as bubbles of gas; small scale explosive reaction results, the yield is impaired and the product darkened. I have now found that chlorine is more soluble than acetylene in acetylene tetrachloride, and if the chlorine is introduced below the acetylene the two reagents may be prevented from coming together as bubbles, the reaction is rendered smoother and the yield and color of the product are improved. Also, a greater output of product can be obtained from a given reactor.

When carrying out the reaction of chlorine and acetylene in a body of acetylene tetrachloride, and in presence of comminuted iron, the iron acts usefully not only as a catalyst but also as gas dispersal material. However, it is necessary to control the temperature carefully, otherwise ferric chloride is formed so copiously that it crystalizes out and clogs the system. I find the optimum temperature to be 70° to 95° C. I maintain the temperature within these limits by circulating the body of acetylene tetrachloride through an external cooler, under careful temperature control.

Referring to the drawing, this is an elevation, partly in section, of typical apparatus for carrying out my process. In the figure, 1 is the reactor and 2 the cooler, both of which may be of steel. Reactor 1 is provided with a cone bottom 3 and top closure 4, which includes a frangible diaphragm 5, preferably of an impregnated textile material. Reactor 1 is packed with coarsely comminuted iron, as shown at 6. Sparger pipes 7 and 8, preferably projecting into the reactor and discharging downwardly through a plurality of small orifices as shown, are provided for admission of chlorine and acetylene respectively, the lower of these two pipes being used for the chlorine. Pipe 9 is provided for discharge of liquid acetylene tetrachloride downward and vent gases upward.

The body of acetylene tetrachloride is circulated downward through reactor 1 and through cooler 2 by means of pump 10 and pipes 11 and 12. Cooling water is admitted to the cooler and discharged therefrom through pipes 13 and 14 respectively, the supply being regulated by valve 15. The temperature within the body of the reactor is noted by thermometer 23. It is maintained between the desired limits of 70° to 95° C. by regulating the supply of cooling water. The temperature of the circulating medium is noted by thermometer 16, let into pipe 12. The reading of thermometer 16 bears a fixed relation to that of thermometer 23, and may be conveniently used for control. The body of acetylene tetrachloride flowing downward through the reactor is augmented by accession of acetylene tetrachloride formed by the reaction therein. A quantity equivalent to that formed overflows the rim of weir 17 and leaves the reactor by pipe 9. The remainder of the body is recycled through the reactor. The upper branch of pipe 9 carrys away excess chlorine and traces of HCl formed as by-product.

If it should be necessary to empty the container, the liquid contents may be drawn off through valve 18. Replenishment of iron is effected by removing the top closure.

The chlorine and acetylene are derived from any convenient source, such as cylinders shown diagrammatically at 19 and 20. The flow of these gases is regulated by valves indicated at 21 and 22.

The reaction takes place principally in the upper part of the reactor, above the point of admission of the acetylene. Downward circulation decreases the net upward velocity of the chlorine and acetylene. It gives more time for the chlorine to dissolve in the medium, especially as much of the chlorine is swept through the cooler and enters the reactor from the top. Downward circulation therefore increased the capacity of a given reactor. It also economizes the relatively expensive acetylene by contacting it with an excess of chlorine at the top of the reactor. The downward velocity must not exceed the upward velocity of bubbles of acetylene in liquid acetylene tetrachloride. The downflow in the reactor is by gravity. In practice I find that it may be at a rate not exceeding 500 gallons per minute per square foot of cross-section thereof. The vertical distance between the two sparger pipes is preferably not less than one eighth of the height of the reactor.

I claim as my invention:

1. The process for production of acetylene tetrachloride by reaction of acetylene with chlorine which comprises introducing gaseous chlorine into a mass of comminuted iron in a reaction zone; introducing the acetylene into said zone at a level substantially above the level of introduction of the chlorine; circulating a body of acetylene tetrachloride downward through said reaction zone, at a velocity not exceeding the upward velocity of bubbles of acetylene in liquid acetylene tetrachloride, and at a temperature between 70° and 95° C.; conducting said body, augmented by the acetylene tetrachloride formed in the reaction zone during its passage therethrough, through a cooling zone; withdrawing from said body acetylene tetrachloride in quantity equivalent to that acquired during its last passage through the reaction zone; recycling the remainder thereof through the reaction zone; and regulating the cooling in said cooling zone to maintain the stated temperature in the reaction zone.

2. The process for production of acetylene tetrachloride by reaction of acetylene with chlorine which comprises introducing gaseous chlorine into a mass of comminuted iron in a reaction zone; introducing the acetylene into said mass at a level substantially above the level of introduction of the chlorine; circulating a body of acetylene tetrachloride downward through the reaction zone, at a velocity not exceeding the upward velocity of bubbles of acetylene in liquid acetylene tetrachloride, and at a temperature between 70° and 95° C.; conducting said body, augmented by the acetylene tetrachloride formed in the reaction zone during its passage therethrough, through a cooling zone; withdrawing from said body acetylene tetrachloride in quantity equivalent to that acquired during its last passage through the reaction zone; recycling the remainder thereof through the reaction zone; and regulating the cooling in said cooling zone to maintain the stated temperature in the reaction zone.

3. The process for production of acetylene tetrachloride by reaction of acetylene with chlorine which comprises introducing gaseous chlorine into a mass of comminuted iron in a reaction zone; introducing the acetylene into said zone at a level substantially above the level of introduction of the chlorine; circulating a body of acetylene tetrachloride downward through the reaction zone, at a rate not exceeding 500 gallons per minutes per square foot of cross-section thereof, and at a temperature between 70° and 95° C.; conducting said body, augmented by the acetylene tetrachloride formed in the reaction zone during its passage therethrough, through a cooling zone; withdrawing from said body acetylene tetrachloride in quantity equivalent to that acquired during its last passage through the reaction zone; recycling the remainder thereof through the reaction zone; and regulating the cooling in said cooling zone to maintain the stated temperature in the reaction zone.

4. The process for production of acetylene tetrachloride by reaction of acetylene with chlorine which comprises introducing gaseous chlorine into a column of comminuted iron in an upright elongated reactor; introducing the acetylene into said column at a level substantially above the level of introduction of the chlorine; circulating a body of acetylene tetrachloride downward through the reaction zone, at a velocity not exceeding the upward velocity of bubbles of acetylene in liquid acetylene tetrachloride, and at a temperature between 70° and 95° C.; conducting said body, augmented by the acetylene tetrachloride formed in the reactor during its passage therethrough, through a cooler; conducting the augmented and cooled body to the upper part of the reactor and there withdrawing from it acetylene tetrachloride in quantity equivalent to that acquired during its last passage through the reactor; recycling the remainder thereof through the reactor; and regulating the cooling in said cooler to maintain the stated temperature in the reactor.

5. The process for production of acetylene tetrachloride by reaction of acetylene with chlorine which comprises introducing gaseous chlorine into a column of comminuted iron in an upright elongated reactor, at a level near the lower end thereof; introducing the acetylene into said column at a level substantially above the level of introduction of the chlorine; circulating a body of acetylene tetrachloride downward through said reactor, at a velocity not exceeding the upward velocity of bubbles of acetylene in liquid acetylene tetrachloride, and at a temperature between 70° and 95° C.; conducting said body, augmented by the acetylene tetrachloride formed in the reactor during its passage therethrough, through a cooler; conducting the augmented and cooled body to the upper part of the reactor and there withdrawing from it acetylene tetrachloride in quantity equivalent to that acquired during its last passage through the reactor; recycling the remainder thereof through the reactor; and regulating the cooling in said cooler to maintain the stated temperature in the reactor.

6. The process for production of acetylene tetrachloride by reaction of acetylene with chlorine which comprises introducing gaseous chlorine into a column of comminuted iron in an upright elongated reactor; introducing the acetylene into said column at a level substantially above the level of introduction of chlorine; circulating a body of acetylene tetrachloride downward through said reactor, at a velocity not exceeding the upward velocity of bubbles of acetylene in liquid acetylene tetrachloride and at a temperature between 70° and 95° C.; conducting said body, augmented by the acetylene tetrachloride formed in the reactor during its passage therethrough, through a cooler external to said reactor; conducting the augmented and cooled body to the upper part of the reactor and there withdrawing from it acetylene tetrachloride in quantity equivalent to that acquired during its last passage through the reactor; recycling the remainder thereof through the reactor; and regulating the cooling in said cooler to maintain the stated temperature in the reactor.

AYLMER H. MAUDE.

REFERENCES CITED

The following references are of record in the file of this patent:

UNITED STATES PATENTS

| Number | Name | Date |
| --- | --- | --- |
| 985,528 | Hoefer et al. | Feb. 28, 1911 |
| 1,030,916 | Ornstein | July 2, 1912 |
| 2,022,616 | Berliner | Nov. 26, 1935 |
| 2,119,721 | Richardson | June 7, 1938 |
| 2,295,591 | Maude | Sept. 15, 1942 |